United States Patent
English

(12) United States Patent English
(10) Patent No.: US 6,534,709 B2
(45) Date of Patent: Mar. 18, 2003

(54) COMMUNICATIONS DISTRIBUTION BOX HAVING IMPROVED ACCESS

(75) Inventor: Stephen T. English, Williamstown, WV (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 09/875,562

(22) Filed: Jun. 6, 2001

(65) Prior Publication Data

US 2002/0185293 A1 Dec. 12, 2002

(51) Int. Cl.[7] .................................. H01J 15/00
(52) U.S. Cl. .................. 174/50; 174/58; 220/4.02; 248/906
(58) Field of Search .............................. 174/48, 50, 58, 174/65 R, 63, 64; 439/535, 676; 220/4.02, 3.8, 3.6; 248/906

(56) References Cited

U.S. PATENT DOCUMENTS

| | | | | |
|---|---|---|---|---|
| 4,842,551 A | * | 6/1989 | Heimann | 174/58 X |
| 4,993,970 A | * | 2/1991 | Littrell | 174/48 X |
| 5,378,174 A | * | 1/1995 | Brownlie et al. | 174/65 R |
| 5,391,095 A | * | 2/1995 | Born | 439/676 |
| 6,215,067 B1 | * | 4/2001 | Chen | 174/66 |
| 6,315,604 B1 | * | 11/2001 | Lee | 439/535 |
| 6,362,421 B1 | * | 3/2002 | Layton, Jr. | 174/50 |

OTHER PUBLICATIONS

Doug Mockett & Company, Inc., Catalog No. 20, Year 2002, pp. 20,/ 25.

* cited by examiner

*Primary Examiner*—Dean A. Reichard
*Assistant Examiner*—Dhiru R Patel
(74) *Attorney, Agent, or Firm*—McAndrews, Held & Malloy, Ltd.

(57) ABSTRACT

A distribution box for supporting a plurality of distribution jacks, each distribution jack having a first terminal and a second terminal, the distribution box being configured to permit a plurality of cables to be selectively interconnected with the plurality of distribution jacks, the distribution box includes a housing defining a hollow interior, The housing having a wall adapted to support The plurality of such distribution jacks such that the first terminal of each distribution jack is positioned in the hollow interior and the second terminal of each distribution jack is accessible from the exterior of the housing, and the housing having an opening configured to allow The cables to be routed into The hollow interior for interconnection to the first terminals of The distribution jacks; and a removable shield mountable over The opening and being adapted to seal around the cables disposed in The opening.

12 Claims, 3 Drawing Sheets

COMMUNICATIONS DISTRIBUTION BOX HAVING IMPROVED ACCESS

FIELD OF THE INVENTION

The present invention relates generally to a distribution box for use with service distribution systems and, more particularly, to a distribution box which can be used for activation of services such as communication or data.

BACKGROUND OF THE INVENTION

This invention relates to distribution boxes, and more particularly to a communication distribution box for in-floor communication distribution systems.

Raised floor distribution systems are commonly employed in facilities such as offices, computer rooms and stock exchanges. A typical raised floor distribution system consists of a series of floor panels supported at a predetermined height above the subfloor by vertical pedestals. The raised floor serves as the working floor for the facility. The space between the raised floor and the subfloor is used to accommodate the electric cables; fiber optic lines; pipes; heating, ventilating and air conditioning (HVAC); and other utility services for the facility. Openings are formed in the raised floor to access the various services at desired locations. Organizing the utility services in predetermined routes below the raised floor is advantageous because it provides a clean and uncluttered working space on the raised floor.

It is known to use distribution boxes in connection with the raised floor systems to allow source service cables to be routed to a variety of locations. Specifically, source service cables are routed into the distribution boxes and interconnected with jacks or ports that are carried on a face of a distribution box. Distribution cables can be interconnected with the jacks and routed to desired locations within the building. In this manner, it is possible for a single source cable to provide service to a plurality of locations.

In one type of prior distribution box, source cables are routed into the distribution box through knock out sections. Such designs may be used with or without conduit. This type of design is disadvantageous because it greatly restricts the number of and locations at which source cables may enter the distribution box.

It is also known to provide distribution boxes with removable panels. In these boxes the removable panel has a limited number of cut out sections where cables are routed into the box. Again, such designs are disadvantageous because they restrict the number of and locations at which source cables can be routed into the box. Additionally, these designs may result in cable damage when the removable cover is resinstalled on the distribution box over the cable.

Because these boxes are used in underfloor settings, they are exposed to dust. Prior boxes are prone to dust infiltration which can adversely effect the performance of the communications network.

A need therefore exists for a distribution box which accommodates a greater number of cables and provides greater flexibility for configuring and routing cables. A need also exists for a distribution box which restricts dust and other airborne contaminants from entering the box.

BRIEF SUMMARY OF THE INVENTION

In accordance with at least one preferred embodiment of the present invention, a distribution box is provided for supporting a plurality of distribution jacks, each distribution jack having a first terminal and a second terminal, the distribution box being configured to permit a plurality of cables to be selectively interconnected with the plurality of distribution jacks. The distribution box comprising, a housing defining a hollow interior, the housing having a wall adapted to support the plurality of distribution jacks such that the first terminal of each distribution jack is positioned in the hollow interior and the second terminal of each distribution jack is accessible from the exterior of the housing, and the housing having an opening configured to allow the cables to be routed into said hollow interior for interconnection to the first terminals of said distribution jacks; and a removable shield mountable over said opening and being adapted to seal around the cables disposed in said opening.

One aspect of an embodiment of the present invention is the use of a brush as a removable shield. Another aspect of a preferred embodiment of the present invention is the use of a rubber grommet as a removable shield. Another aspect of a preferred embodiment of the present invention is the use of a foam grommet as a removable shield.

One aspect of a preferred embodiment of the present invention is the use of upper and lower portions to form the housing. Another aspect of a preferred embodiment of the present invention includes the upper and lower housing being slidably connected. Another aspect of a preferred embodiment of the present invention includes the removable shield being attached to the upper housing portion, and the upper housing portion is removable from the lower housing portion.

These and other features of the preferred embodiments are discussed or will become apparent in the following detailed description of the preferred embodiments of the present invention.

BRIEF DESCRIPTION OF THE SEVERAL VIEWS OF THE DRAWINGS

The foregoing summary, as well as the following detailed description of the preferred embodiments of the present invention, will be better understood when read in conjunction with the appended drawings. For the purpose of illustrating the preferred embodiments of the present invention, there is shown in the drawings, embodiments which are presently preferred. It should be understood, however, that the present invention is not limited to the arrangements and instrumentality shown in the attached drawings.

DETAILED DESCRIPTION OF THE PREFERRED EMBODIMENT OF THE INVENTION

Figure 1:
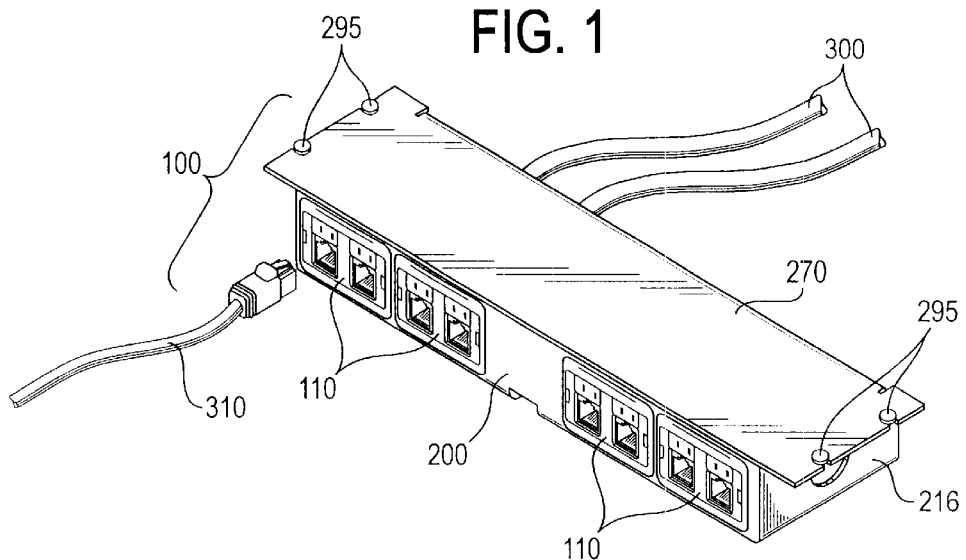
FIG. 1 illustrates a front perspective view of an assembled distribution box according to certain aspects of a preferred embodiment of the present invention.

While the invention will be described in connection with one or more embodiments, it will be understood that the invention is not limited to those embodiments. On the contrary, the invention includes all alternatives, modifications, and equivalents as may be included within the spirit and scope of the applicant's invention.

In the illustrated embodiment, the distribution box 100 is generally rectangular and it includes a top wall 270, a bottom wall 205, a front wall 217, a back wall 280 and a pair of opposed side walls 215, 216 defining a hollow interior space. An opening 230 extends along a substantial portion of the back wall 280 and preferably along essentially the entire length of the back wall 280. The opening 230 allows source cables 300 to be routed into the box 100 for interconnection with the distribution jacks 110 carried by the box 100. In the illustrated embodiment the distribution jacks 110 are mounted in the front wall 217. However, it will be appreciated that the distribution jacks 110 could be mounted in other walls, such as the side walls 215, 216 or the top wall 270. The distribution jacks 110 have first terminals 111 which are interconnected with the source cables 300 and present second terminals 112 which are accessible from external to the box 100. Distribution cables 310 can be plugged into the external terminals 112 to selectively route services from the distribution box 100.

The distribution jack 110 can be made up of a universal frame 240 and a conventional communication conductor 250. The frame 240 is snapped or otherwise secured into the hollow openings 260 in the front wall 217. The communication connector 250 is snapped or otherwise secured into the frame 240. It will be appreciated that different communication assemblies 110 may be used.

Figure 2:
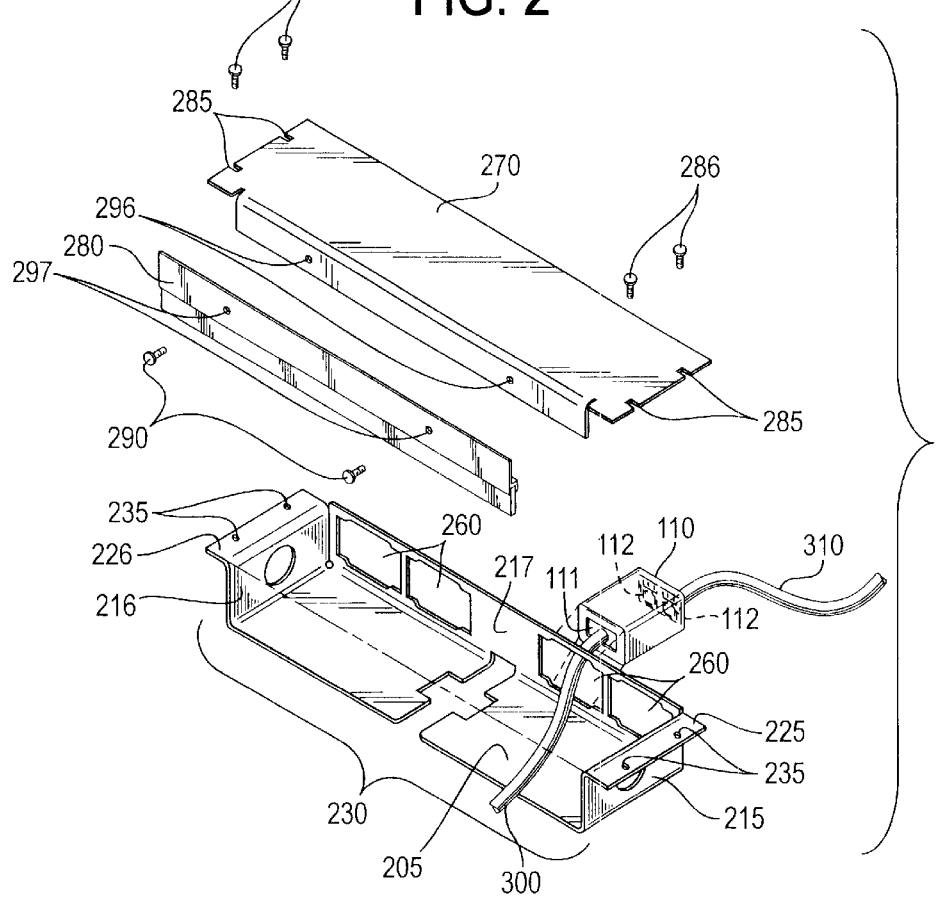
FIG. 2 illustrates an exploded rear perspective view of the distribution box of FIG. 1.
Figure 3:
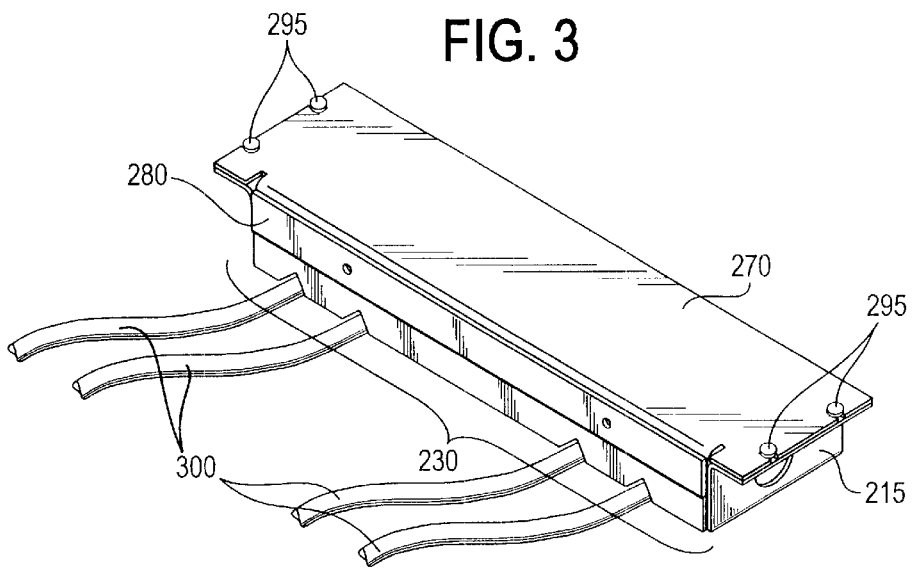
FIG. 3 is a rear perspective view of the assembled distribution box of FIG. 1.

FIGS. 1, 2 and 3 illustrate a communication floor box 100 for providing connections to one or more in-floor service distribution systems. The lower portion of the floor box 100 includes a bottom wall 205 with side walls 215, 216, 217 extending upwardly therefrom. The side walls 215, 216 have flanges 225, 226 that extend outwardly and include holes 235 for securing the upper portion of the floor box. The lower portion of the floor box has a back opening 230 for access to the distribution jacks 110.

The top wall 270 forms a contiguous top on the floor box 100. The top wall 270 includes holes 285 which align with holes 235 in the flanges 225, 226 of the side walls 215, 216 of the lower portion. The top wall 270 is fastened to the lower portion by fasteners 286. The top wall 270 may be adapted to slidably engage the lower portion of the floor box 100.

Figure 5:
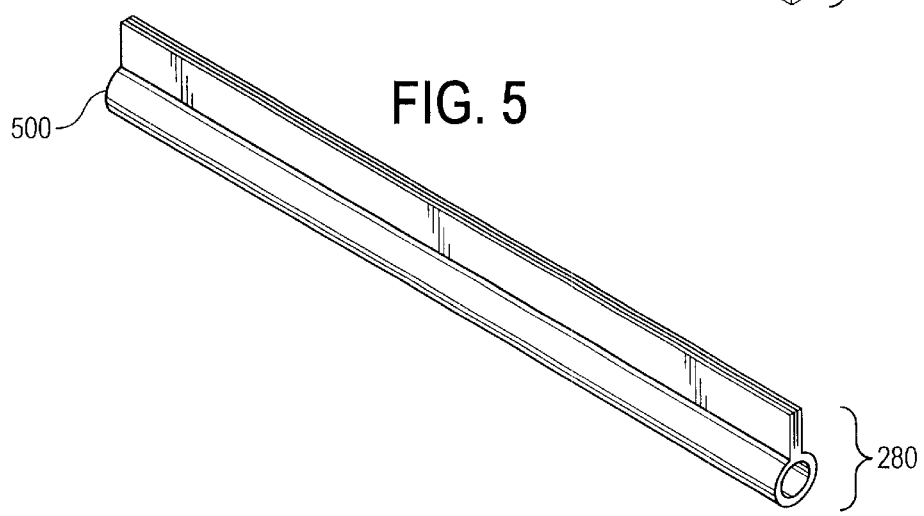
FIG. 5 illustrates a guard of a third embodiment of the present invention.

The back wall 280 is attached to the top wall 270 and covers the back opening 230 of the distribution box 100. The back wall 280 may be attached to the top wall 270 by fasteners 290 through holes 296, 297. As shown in FIG. 5, the back wall 280 may also be attached to the top wall 270 by a friction fit. As shown in FIGS. 2 and 3, the back wall 280 covers the opening 230 and the source cable 300.

Figure 4:
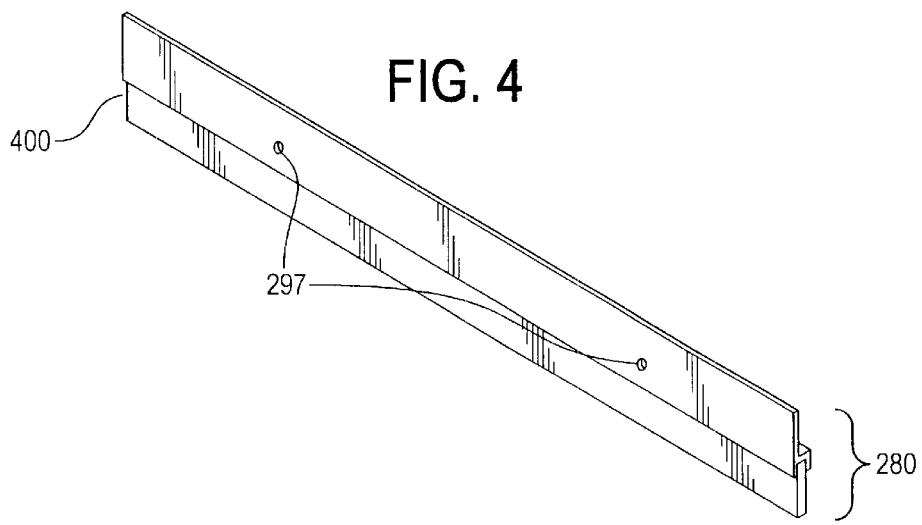
FIG. 4 illustrates a guard of a second embodiment of the present invention.

The opening in the back wall 280 allows the source cable 300 to enter the opening 230 at any location. The back wall 280 prevents dust or dirt from entering the floor box 100. The top wall 270 and, therefore, the back wall 280, which is connected thereto, may be attached and removed to the lower portion of the floor box without damaging the source cable 300. As shown in FIG. 4, in one preferred embodiment the back wall 280 is a brush 400. As shown in FIG. 5, in another preferred embodiment the back wall 280 is a rubber or foam grommet 500.

The lower portion of the floor box is preferably metallic, whereas the upper portion of the floor box may be metallic or another material such as plastic. One type of plastic which may be used for molding the upper portion of the floor box is PVC.

Figure 6:
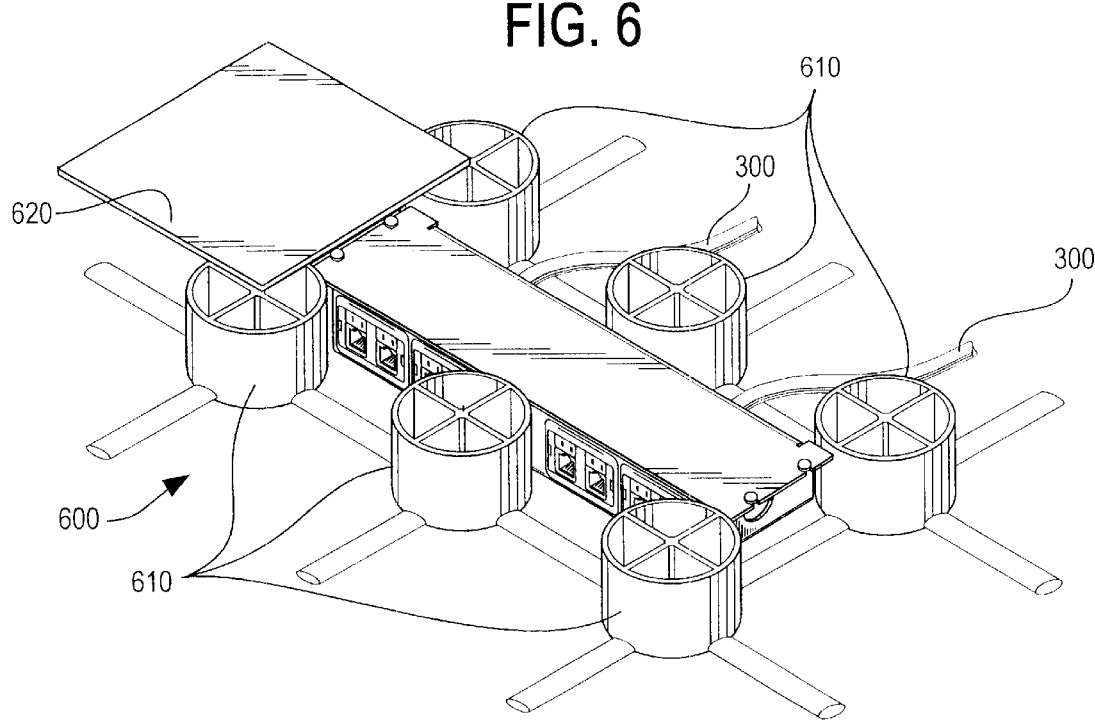
FIG. 6 illustrates a raised floor system of a preferred embodiment of the present invention.
Figure 7:
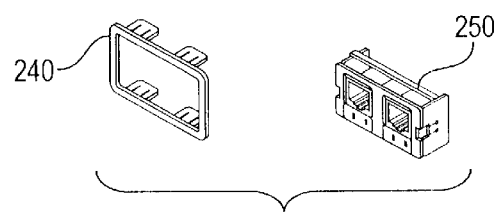
FIG. 7 illustrates a communication jack of a preferred embodiment of the present invention.

A preferred embodiment of the present invention can be used in raised floor systems. As shown in FIG. 6, the bottom portion of the distribution box 100 is mounted on the subfloor 600 in between vertical pedestals 610. The source cable 300 is routed to the distribution box 100 and interconnected with the first terminal 111 of the distribution jacks 110. The top wall 270 is secured to the flanges 225, 226 of the lower portion. The back wall 280 is then secured to the top wall 270 over the source cable 300. Distribution cables 310 are connected to the second terminal 112 of the distribution jacks 110 and routed to the desired location. Floor panels 620 are then placed over the vertical pedestals 610, thereby covering the distribution system.

While the distribution box 100 is described in the context of a raised floor system, it should be appreciated that it is not limited to this environment. For example, the distribution box 100 could be installed in a ceiling panel system, a computer closet or any other such locations to provide a centralized distribution source.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A distribution box for supporting a plurality of distribution jacks, each distribution jack having a first terminal and a second terminal, said distribution box being configured to permit a plurality of cables to be selectively interconnected with said plurality of distribution jacks, the distribution box comprising:

a housing defining a hollow interior, said housing having a wall adapted to support said plurality of such distribution jacks such that the first terminal of each distribution jack is positioned in the hollow interior and the second terminal of each distribution jack is accessible from the exterior of the housing, and the housing having an opening configured to allow said cables to be routed anywhere through the opening into said hollow interior for interconnection to the first terminals of said distribution jacks;

wherein said housing comprises a lower housing portion having a base and a plurality of side walls extending upwardly from the base and an upper housing portion connectable to the plurality of side walls of the lower housing portion forming the hollow interior; and a removable shield mountable over said opening and being adapted to seal around the cables disposed in said opening, wherein said removable shield is attached to said upper housing portion and said upper housing portion is removable from said lower housing portion.

2. The distribution box of claim 1, wherein said upper housing portion is slidably connectable to said lower housing portion.

3. The distribution box of claim 1, wherein said removable shield comprises a brush.

4. The distribution box of claim 1, wherein said removable shield comprises a rubber grommet.

5. The distribution box of claim 1, wherein said removable shield comprises a foam grommet.

6. The distribution box of claim 1, wherein said distribution box comprises a communication cable box.

7. A distribution box for supporting at least one distribution jack, and at least one source distribution cable selectively interconnected with said distribution jack, the distribution box comprising:

a lower housing portion;

an upper housing portion;

side walls extending between the upper and lower housing portions;

wherein the upper housing portion, the lower housing portion, and the side walls define a main interior compartment and an opening allowing at least one distribution cable to said main interior compartment anywhere through the opening; and a removable shield for covering said opening and the distribution cables disposed within said opening, wherein said removable shield is attached to said upper housing portion and said upper housing portion is removable from said lower housing portion.

8. The distribution box of claim 7, wherein said upper housing portion is slidably connectable to said lower housing portion.

9. The distribution box of claim 7, wherein said removable shield comprises a brush.

10. The distribution box of claim 7, wherein said removable shield comprises a rubber grommet.

11. The distribution box of claim 7, wherein said removable shield comprises a foam grommet.

12. The distribution box of claim 7, wherein said distribution box comprises a communication cable box.

* * * * *

UNITED STATES PATENT AND TRADEMARK OFFICE
CERTIFICATE OF CORRECTION

PATENT NO. : 6,534,709 B2
DATED : March 18, 2003
INVENTOR(S) : Stephen T. English It is certified that error appears in the above-identified patent and that said Letters Patent is hereby corrected as shown below:

This certificate supersedes Certificate of Correction issued July 1, 2003, the number was erroneously mentioned and should be vacated since no Certificate of Correction was granted.

Signed and Sealed this

Twenty-second Day of June, 2004

JON W. DUDAS
*Acting Director of the United States Patent and Trademark Office*